Dec. 10, 1929.  H. A. SELAH  1,738,968
DEVICE FOR SECURING ELECTRIC APPLIANCES TO CONDUIT BOXES
Filed Aug. 31, 1925
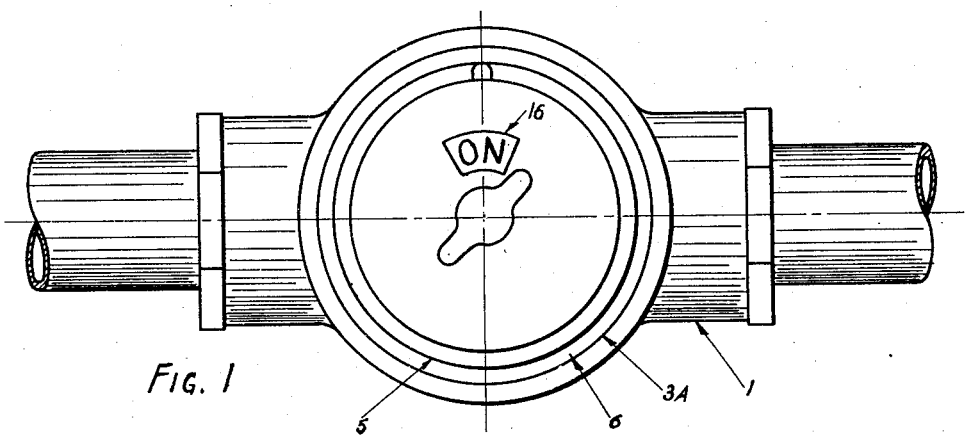
FIG. 1
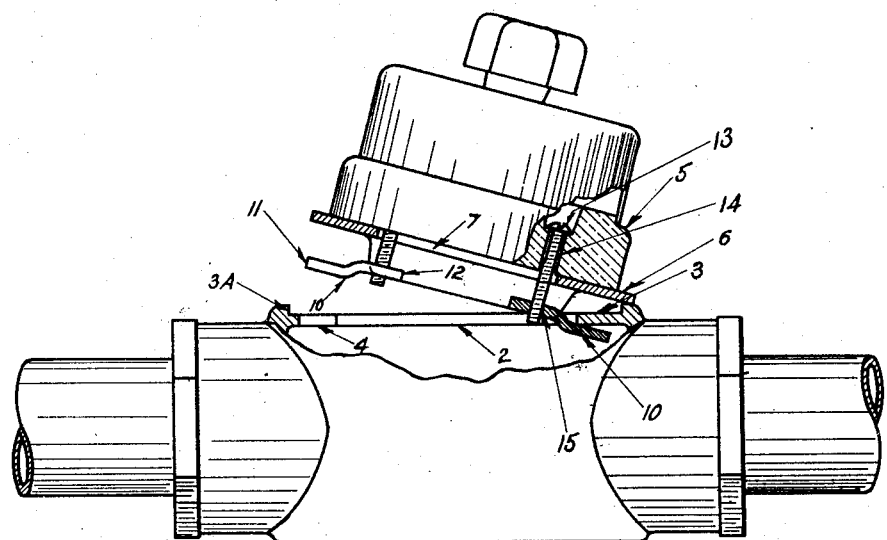
FIG. 2
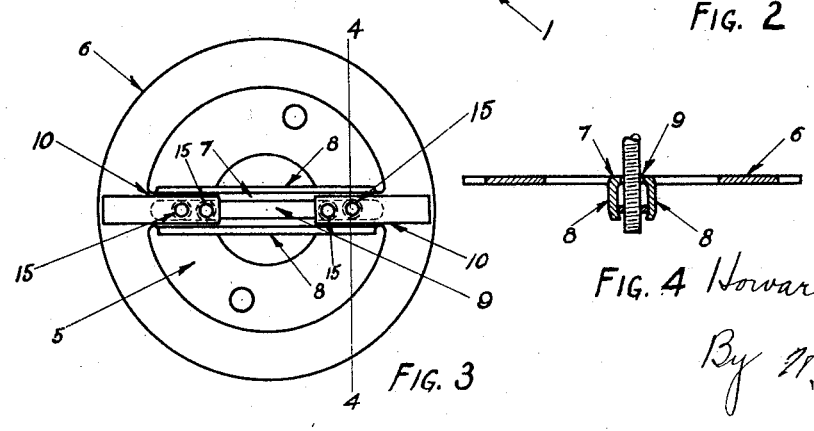
FIG. 3
FIG. 4
Inventor
Howard A. Selah
By
Attorney Patented Dec. 10, 1929

1,738,968

UNITED STATES PATENT OFFICE

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA

DEVICE FOR SECURING ELECTRIC APPLIANCES TO CONDUIT BOXES

Application filed August 31, 1925. Serial No. 53,483.

It is desirable to secure electric appliances, such as switches, to conduit boxes. These fittings vary in size and the relation of the attaching parts and the present invention is designed to facilitate the securing of such appliances with relation to their variations. Features and details of the invention will appear from the specification and claims.

The invention is illustrated in the accompanying drawings as follows:—

Fig. 1 shows a plan view of the device.

Fig. 2 a side elevation, a part being broken away to better show construction.

Fig. 3 a bottom view of the attaching plate.

Fig. 4 a section on the line 4—4 in Fig. 3.

1 marks the conduit box, and 2 an opening leading to the box. This is surrounded by a flange 3 and an annular shoulder 3ª.

An appliance 5 is shown in the form of an ordinary switch and this is mounted on an attaching plate 6. The attaching plate is in the form of a ring which rests on the flange 3 and within the shoulder 3ª. It has a bridge plate 7 extending across the ring 6 and this is provided with down-turned flanges 8 and also a slot 9 extending across the bridge.

Clamping lugs 10 preferably having small downwardly bent portions have the projecting ends 11 adapted to extend under the flange 3 and the perforated ends 12 adapted to extend into the guide formed by the flanges 8. Screws 13 extend through perforations 14 in the switch block and into a screw threaded opening 15 in the lugs 10, the lugs preferably having a plurality of openings 15 so that with the wide variation of the screw openings 14 they can accommodate the screws without disturbing the position of the ends 11 of the lugs. Small variations, however, are taken care of, the slot 9 accommodating such variations and the length of the lugs being such as to permit of quite a considerable variation in their relation to each other.

In assembling the device one lug is hooked under the flange 3. The other lug is passed through a slot 4 in the flange and then the whole device is turned in one direction, or the other in order to bring the parts of the appliance, as for instance the indicating dial 16, into proper position. After the part is moved to the position desired the screws 13 are tightened thus securely clamping the appliance in place.

What I claim as new is:—

1. In a device for securing electric appliances having screw openings to conduit boxes, the combination of an attaching plate on the one side of which the appliance is placed, said plate having radially extending slots; opposing and relatively moving clamping lugs on the opposite side of the plate and spaced from the plate to permit the clamping engagement of an inserted flange; screws adapted to engage an appliance, said screws extending through the slots and into the lugs; and guide ways on the inner side of the plate of a width to slidingly engage the lugs and prevent their turning and of a depth permitting the adjustment of the lugs toward and from the plate to accommodate the thickness of an inserted flange.

2. In a device for securing electric appliances having screw openings to conduit boxes, the combination of an attaching plate on the one side of which the appliance is placed, said plate having radially extending slots and downwardly extending lips formed of the metal of the plate and extending each side of the slots; opposing and relatively moving clamping lugs on the opposite side of the plate and spaced from the plate to permit the clamping engagement of an inserted flange; and screws adapted to engage an appliance and extending through the slots into the lugs, the downwardly turned lips having sufficient depth to permit of the adjustment of the lugs toward and from the plate to accommodate an inserted flange and spaced apart to engage the edges of the lugs and prevent the turning thereof.

In testimony whereof I have hereunto set my hand.

HOWARD A. SELAH.